United States Patent [19]

Amazeen et al.

[11] Patent Number: 4,745,812
[45] Date of Patent: May 24, 1988

[54] TRIAXIAL TACTILE SENSOR

[75] Inventors: Charles A. Amazeen, Arlington; Steven S. Bishop, Stafford, both of Va. both of Va.

[73] Assignee: The United States of America as represented by the Secretary of the Army, Washington, D.C.

[21] Appl. No.: 29,912

[22] Filed: Mar. 25, 1987

[51] Int. Cl.⁴ ............................ G01L 1/22; G01L 5/16
[52] U.S. Cl. .................................. 73/862.04; 73/777; 338/47; 901/33; 901/46
[58] Field of Search .................. 73/777, 862.04, 865.7; 338/47; 340/365 A; 901/33, 46

[56] References Cited

U.S. PATENT DOCUMENTS

| Re. 29,765 | 9/1978 | Crane et al. |
|---|---|---|
| 3,509,583 | 5/1970 | Fraioli |
| 3,751,733 | 8/1973 | Fletcher |
| 4,588,348 | 5/1986 | Beni et al. |
| 4,640,137 | 2/1987 | Trull et al. |
| 4,680,606 | 7/1987 | Knutti et al. ........................... 73/777 |

FOREIGN PATENT DOCUMENTS 0164231  8/1985  Japan ................................ 73/862.04

OTHER PUBLICATIONS

Article "Triaxial Force Sensor" by Termpoon Korvattana of S.R.I. International, Menlo Park, Calif. 94025, pp. 71–79, presented at the 1982 Carnahan Conference on Security Technology at the University of Kentucky, Lexington, KY. on May 12–14 1982.

Article "Robotic Tactile Sensing" by Kirk E. Pennywitt, pp. 177, 178, 180, 182, 184–186, 188, 190, 193, 195, 196, 198, 200, of BYTE Magazine, Jan. 1986 issue, published by McGraw Hill Co.

Article "Flexible Tactile Sensing Arrays for Robotics: Architectual Robustness and Yield Considerations" authored by Phillip W. Barth, et al, of the Center for Integrated Systems at Stanford University, Stanford, Calif. A 94305, dated approx. Feb. 18, 1985, pp. 6, 7 and 8.

Primary Examiner—Charles A. Ruehl
Attorney, Agent, or Firm—John E. Becker; Anthony T. Lane

[57] ABSTRACT

The sensitive high resolution microminiature tactile sensor comprises an array of unique micromachined bossed silicon transducer cells in conjunction with requisite electrical circuitry and components, which collectively provide an ability to sense torque by detecting both normal and lateral applied loads, thereby opening a new frontier in tactile sensing. One preferred embodiment comprises a four column by four row array arrangement providing sixteen unique bossed closely spaced silicon diaphragm tactile transducer elements or sensors fabricated from a silicon body member. Collectively the close spacing between the microminiature tactile sensing elements approaches the resolution of the human hand. Electrical signal information from sensor-incorporated internal and external related circuitry components can be analyzed via computer devices to yield specific loading characteristics on the sensor surface. The upper surface of the transducer cell array is protectively covered with a thin polymer layer. The related circuitry may be fabricated by various known processes including diffused piezoresistive areas and deposited thin film conducting strips and tap-off points. These areas and related conductive circuitry for each of the microsmall sensor elements are configurable as two Wheatstone bridges which thereby help provide for the measurement of both normal and lateral load component magnitudes.

14 Claims, 8 Drawing Sheets

TRIAXIAL TACTILE SENSOR

GOVERNMENT INTEREST STATEMENT

The invention described herein may be manufactured, used and licensed by or for the Government for Governmental purpose without the payment to us of any royalties thereon.

BACKGROUND OF THE INVENTION

This invention relates generally to tactile sensors and more specifically to improved triaxial force detectible tactile sensors made up of a microminiature array of multiple transducers, and particularly adapted for use with grasping end portions of robotic manipulatable end-effector arms. A tactile sensor is a device that is designed to be sensitive to one or more parameters that the human touch can detect such as temperature, object contour, and object surface texture. Tactile sensing has been defined as the continuous sensing of variable contact forces commonly by an array of sensors.

Up until recently, the presently known sensors used on robotic end-effectors have been able to detect and measure only normal direction applied loads, that is, those applied perpendicular to the sensor surface. They have had no known capability for detecting lateral or shear loads, nor for direct measurement of slippage of the object being robotically grasped. Thus, heretofore the many types of objects handled robotically essentially necessarily have been primarily limited to those where only normal loading is being applied, detected and measured.

PRIOR ART DISCUSSION

Triaxial force sensors have been previously proposed, but the one of which we are aware is for use in conjunction with non-analogous subject matter involving large scale intrusion detection perimeter systems related to chain link fence enclosures. This prior use contemplated such a sensor comprising a sensing probe attached to the center of a circular aluminum diaphram 0.05 inch thick and approximately three inches in diameter mounted in a strong aluminum case, and was designed to detect motion in three major axes of the fence fabric and the fence post through the sensing probe. This prior art probe is adapted to be attached to the fence fabric or to the fence post, whereas the body of the sensor is rigidly mounted separate from the fence. A composite force applied to the probe deflects the diaphragm into a specific shape corresponding to the magnitude and direction of the force. The deformation of the diaphragm is converted into electrical signals by eight strain gauges attached to the diaphragm and connected in an appropriate manner with circuitry including two wheatstone bridges. The aforementioned prior art is disclosed in an article entitled TRIAXIAL FORCE SENSOR authored by Termpoon Kovattana of SRI International, Menlo Park, Calif. 94025. The article is believed to have been presented as part of the proceedings of the 1982 Carnahan Conference on Security Technology, sponsored by the University of Kentucky, Lexington, Ky. (May 12-14, 1982).

Another prior art use of a three dimensional or triaxial force transducer system is disclosed in U.S. Pat. No. Re. 29,765 Sept. 19, 1978, but also relates to a non-analogous writing instrument which generates electrical signals indicative of the force applied and the direction of motion taken by the writing instrument.

While the foregoing are examples of triaxial force sensing, none of the prior art of which we are aware teach or suggest that it would be obvious to fabricate them from the presently disclosed silicon crystal and related materials, and to drastically miniaturize them by the many orders of magnitude smaller down to the millimeter and micron dimension for more sensitive applications needed for achieving our non-related robotic tactile sensing as disclosed in this present application.

A large amount of prior art involves electromechanical prosthetic devices having other different forms of tactile sensors mounted therein for controlling the operation thereof such as referred to in U.S. Pat. Nos. 3,751,733 and 3,509,583. They are not considered to be anticipatory of the present invention.

Among various other related publications is a comprehensive review of current developments in tactile sensing entitled ROBOTIC TACTILE SENSING, published in the January 1986 issue of BYTE magazine published by McGraw-Hill Co. The author, Kirk E. Pennywitt, discusses a wide realm of tactile sensors for use with industrial robots, the substantive content of which may be considered incorporated herein. The article emphasizes the need for future robots to be able to work with the same tools and equipment, i.e. conventional wrenches, hammers, pliers, screwdrivers, etc., that human workers use; and to achieve these goals they must become equipped with more sophisticated sensory capabilities resembling those of human beings including the ability to detect torque in the sense of objects rotating within the grasp of the end-effector, and shear loads in the sense of objects slipping from the grasp. His article identifies three broad categories of current tactile sensor research, distinguished by their fundamental principles of operation: (1) sensors using electro-optical, (2) piezoresistive, or (3) piezoelectric properties. He reviews some current developments for each category. However, each of the discussed categories still pertain to measurement only of normal applied loads.

The most recent relevant patents of which we are aware are U.S. Pat. Nos. 4,588,348 and 4,640,137. U.S. Pat. No. 4,588,348 is entitled "ROBOTIC SYSTEM UTILIZING A TACTILE SENSOR ARRAY", issued on May 13, 1986 to Geraldo Beni et al and assigned on its face to the AT&T Bell Laboratories, Murray Hill, N.J. While this patent is directed to a somewhat similar array of tactile elements mounted on a substrate and is capable of detecting some torque loads, it is achieved in its own patentably distinctive manner different from the present invention in that it utilizes a different type sensor, i.e. magnetoresistive sensors, and a polymer compliant, noncrystalline medium, which is unlike the pure silicon crystal diaphragm with piezoresistive type sensors of the present invention.

The other recent U.S. Pat. No. 4,640,137 dated Feb. 3, 1987, is entitled TACTILE SENSOR, and is assigned on its face to the Lord Corp. of Erie, Pa. While it discloses a high resolution array type tactile sensor also adapted for use with robot end-effectors it is differently constructed and does not utilize silicon crystal materials or the like. Furthermore, its array includes what amounts to an array of only vertically movable pressure switches for detecting only normal directed forces exerted thereon, unlike the present application which can detect triaxially directed forces applied thereto.

OBJECTS OF THE INVENTION

Accordingly, it is an object of the present invention to provide a greatly improved triaxial tactile sensor embodying one or more arrays of closely spaced, discrete, microminiature bossed silicon diaphragm transducers which in addition to detecting perpendicularly applied loads can additionally detect lateral (shear) loads which enables the detection of object slip and object rotation.

Another object is to increase the applicable robotic uses via the present improved tactile sensor invention, with high resolution approaching that of a human hand thus greatly increasing the number of potential objects that can be more efficiently and effectively grasped by a robotic end-effector.

These and other objects and advantages of providing more human-like sensing for robots will become more apparent from the following detailed description, taken in conjunction with the accompanying illustrative patent drawing figures.

BRIEF SUMMARY OF THE INVENTION

This exemplary tactile sensor invention involves an array of unique micro-machined multiple bossed silicon transducers or transducer cells, and has several novel features including its ability to sense torque by detecting both normal and lateral loads thereby opening a new frontier in tactile sensing. To further help qualify the definition of torque sensing, the torque sensing perpendicular to the surface with only one sensing element, as in the aforementioned AT&T owned U.S. Pat. No. 4,588,348, is considered a special case. That unique situation arises only when the torque vector (moment $M_o$) is centered over the disclosed magnetoresistive type sensing element. As the moment moves away from the center, the sensing element begins to detect a lateral force and eventually this lateral force becomes the dominant characteristic at the sensor surface. Vector Mechanics is taught in a number of text books, including: Vector Mechanics for Engineers: STATICS, Third Edition, F. P. Beer, E. R. Johnston, Jr. (see pages 67–71) McGraw-Hill Book Company, New York, 1977. Torque sensing in the more general case can be solved with the use of an array of sensing elements as contemplated herein. Through signal processing of each array element, the moment can be located and the magnitude determined. This is done by examining each element for its X-Y force components and computing the center of the moment vector and its magnitude. This is the approach in our present sensor design which is the subject of this patent application.

One preferred embodiment comprises a 4 by 4 array or integration preferably of the illustrative four rows and four columns arrangement of sixteen unique bossed silicon diaphragm tactile transducer elements or sensors fabricated from a silicon body member via unique silicon micro-machining technology which includes a chemical etching procedure. Collectively, the close spacing between each tactile sensor element approaches the resolution of the human hand, which is between one and three millimeters spacing for contact sensing. Electrical signal information from the incorporated and related circuitry of our unique sensor can be analyzed via computer to yield specific loading characteristics on the sensor surface. The upper surface of the array of closely spaced tactile sensor elements or cells is preferably protectively covered with a thin polymer layer with exemplary dimensions being shown in the drawings and which will be discussed hereinafter. The related circuitry may be fabricated by known processes to be further described, including diffusion of piezoresistive areas hereinafter referred to as PZRs.

The piezoresistive areas with related tap-off points and conductive circuitry for each of the tactile transducer or sensor elements can be configured as two wheatstone bridges. The wheatstone bridges provide for measurement of both normal load magnitude and lateral load component magnitudes. From these components, a force vector may be computed. All sixteen transducer elements or cells work in concert to provide load distribution information across the overall sensor contact area. With the improved ability of the present innovative sensor to detect both normal and lateral load parameter information, then object contour and object rotation and any related slippage can be detected and measured, thus providing important information unobtainable from heretofore known robot oriented tactile sensors.

DETAILED DESCRIPTION OF A PREFERRED EMBODIMENT

Figure 1:
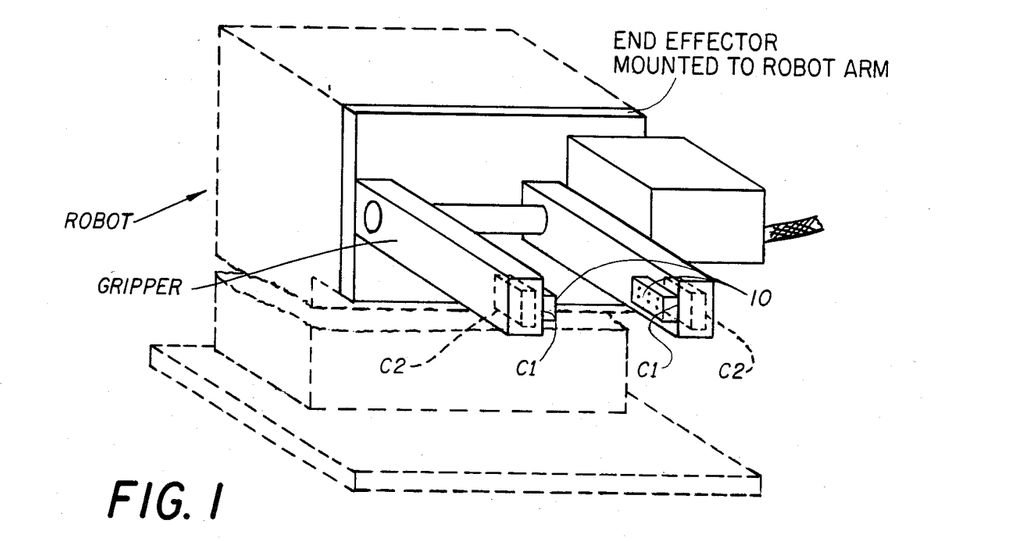
FIG. 1 is a fragmentary persepective view of a typical robot end-effector having tactile sensors mounted on its grippers.
Figure 2:
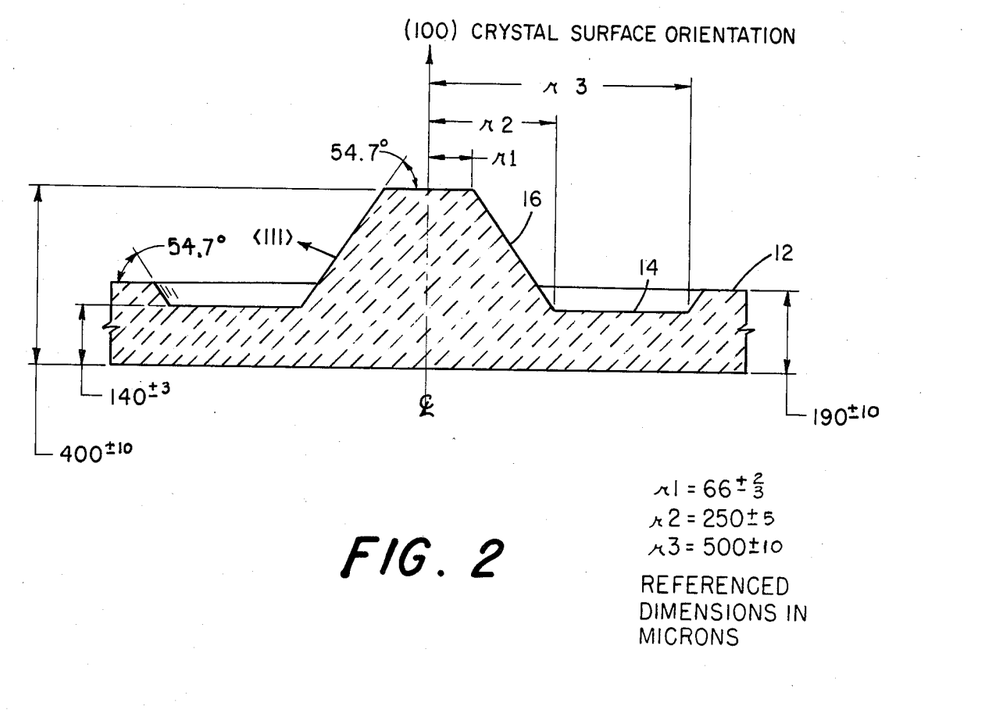
FIG. 2 is a cross-sectional view of one of the transducer tactile sensing elements.
Figure 3:
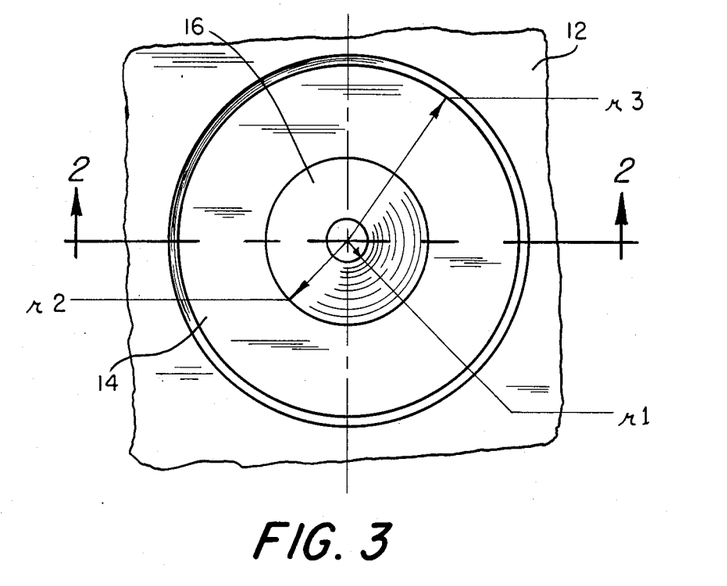
FIG. 3 is a plan view of the sensing element of FIG. 2.
Figure 4:
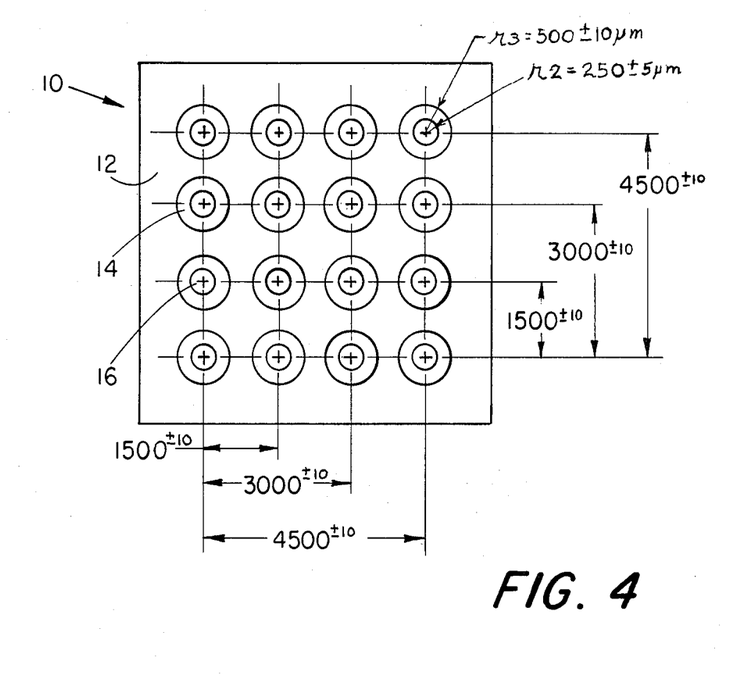
FIG. 4 is a top plan view of one preferred 4 by 4 array of the sensing element shown in FIGS. 2 and 3, disposed in a regular row-column arrangement.
Figure 5:
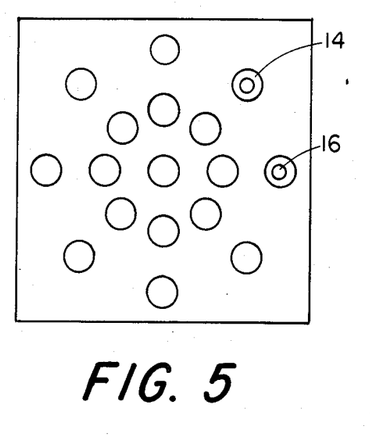
FIG. 5 is a top plan view of another modified arrangement of the sensing elements shown in a polar or circularly disposed array.
Figure 6:
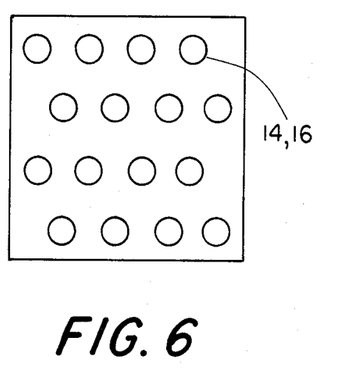
FIG. 6 is still another plan view of the sensing elements shown in an irregular row-column arrangement.
Figure 10A:
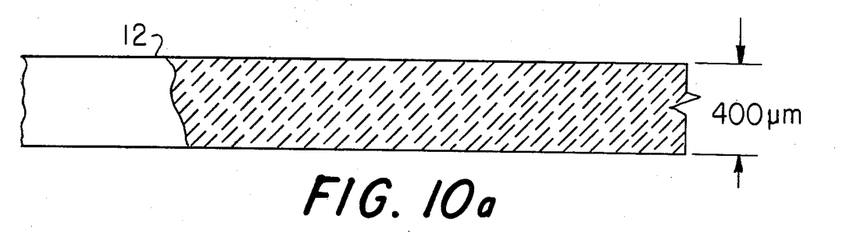
FIGS. 10a–10d are cross-sectional diagrammatic views showing some of the very basic progressive fabrication etching steps to create the tactile sensing element.
Figure 10B:
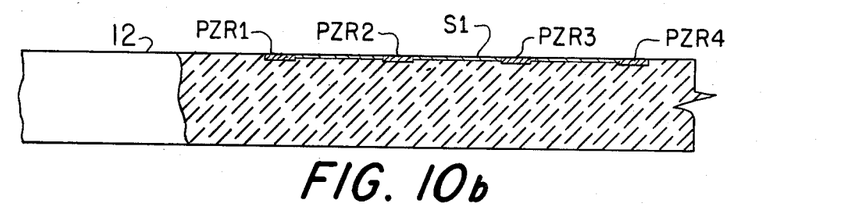
Figure 10C:
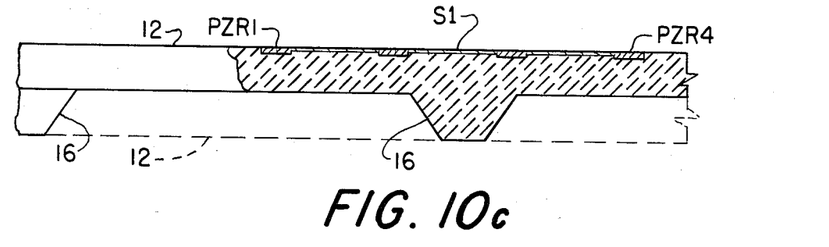
Figure 10D:
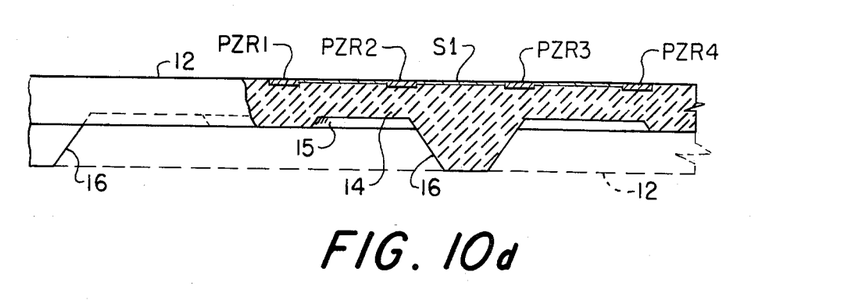

A tactile sensor denoted generally 10 (FIGS. 1 and 4) has been designed and fabricated which utilizes silicon micro-machining technology as a means of fabrication. A silicon wafer about 400 microns thick initially and having very smooth polished opposite top and bottom surfaces is used to fabricate the main body member 12. This wafer, which has a (100) crystal surface orientation is suitably masked, then chemically etched in a repetitious process of which only the basic of many steps are shown in the exemplary FIGS. 10a–10d. This results in a plurality of reduced thickness circular silicon diaphragm portions 14 (FIGS. 2, 3, and 10d) each having an upwardly extended tapered center boss 16, as depicted in FIGS. 2 and 3. The slope or taper of the bosses is such as to preferably maintain a (111) crystal surface orientation thereon. Our array style tactile sensor 10 is comprised of a plurality of these closely spaced silicon bossed diaphragm elements or tactile structures 16. The arrangement of these plural tactile elements 16 which maybe supported upon a similar material laminate supporting member 18, may vary from a regular row-column configuration, as shown in drawing FIG. 4, to a circular or irregular row-column configuration as shown in FIG. 5 and 6, respectively. One preferred embodiment of our tactile sensor preferably comprises sixteen of the etched diaphrgram tactile boss elements 16 disposed in a regular orthogonally disposed four row and four column closely spaced arrangement as per FIG. 4. Each of these diaphragmed tactile elements 16 collectively with its accompanying circuitry C1, C2 (FIG. 1) serves as a transducer element TD to comprise the present improved multitransducer cell sensor device. The silicon wafer or main body 12 may be either n-type or p-type silicon crystal material, with the n-type having a (100) crystal surface orientation being preferred at this time. In our illustrative embodiment, the silicon substrate body material is preferably of the n-type and the piezoresistive-type resistors PZRs to be described hereinafter are preferably selected from a group of materials which will provide a p-type composition. The p-type designation stands for positive, whereas the n-type silicon denotes a negative charge on the silicon atoms. The n-type silicon of which the bulk of the substrate body 12 is composed, has phosphorus as the impurity introduced during the silicon manufacturing process. The p-type has a subtle meaning that a boron impurity is present in the substrate. An ion exchange between the surrounding silicon and the diffused boron impurity used to form the diffused PZRs creates the p-type silicon. The support member substrate or plate 18 is also preferably comprised of a similar silicon or glass-like material (FIGS. 7 and 8), thereby assuring similar thermal expansion characteristics to avoid or minimize thermal stresses on the sensor array.

The silicon wafer from which this sensor is fabricated has very smooth preferably highly polished top and bottom surfaces. Before the micromachining or chemical etching steps are intiated, the bottom or lower surface is preferably processed to have the requisite electrical conductive and piezoresistive areas applied, after which they are protectively covered by a suitable protective coating such as a fine layer of black wax of from about one to two mm thick. This coating will shield the electrical conductive strips and PZR areas during the chemical etching fabrication steps.

With regard to the silicon wafer material from which the body 12 is fabricated, the boules of silicon crystal from which the wafers are cut may frequently be characterized by a flattened side, and each cut-off wafer then generally has a flattened peripheral portion called a Major Flat whose surface is perpendicular to the parallel top and bottom surfaces of the cut wafer. The direction of the crystal lattice is perpendicular to this Major Flat portion and has a (100) crystal surface orientation, whereas the top and bottom parallel surfaces of the silicon wafer are selected to have a (100) crystal surface orientation. Preferably a strategic orientation placement of the piezoresistive type resistors PZRs and thin film conducting strips S1 and S2, to be described further hereinafter, is required upon one of the wafer's top or bottom parallel surfaces. Certain portions are strategically oriented on predetermined X and Y axes which are preferably respectively parallel and perpendicular to the <110> crystal orientation when the top and bottom wafers have a (100) crystal surface orientation. Other variations may occur, such as a reversal of the <100> and <110> crystal orientations. The first mentioned exemplary emplacements are thought to provide the maximum change in resistor value based upon the contemplated strain distribution throughout the diaphragm of each transducer element. This feature takes advantage of the anisotropic nature of silicon. Other composites which are inherently anisotropic might be used as a transduction medium if the piezoresistive type resistors can be applied in a manner permitting satisfactory measurement of strain in that material.

Figure 7:
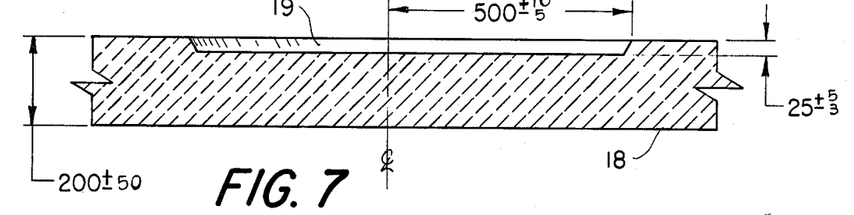
FIG. 7 is an enlarged fragmentary cross-sectional detail view of the support plate in the area recessed for a single tactile sensor element.

FIG. 7 is a cross-sectional detail view of a portion of the support plate 18 shown complementally circularly recessed at 19 to a depth which may range from approximately 15-45 microns preferably by etching, with corresponding recesses for each tactile sensing element in the transducer array. The support plate 18 is aligned and then suitably bonded as by epoxy glue, or electrostatically, to the lower surface of the multiple transducer cell array in a manner assuring alignment to permit accommodation of operative downward and diaphragm boss deflection within the recessed area 19.

The etched excavation depth of recess 19 in the support plate 18 of this embodiment is exemplified as approximately 25 microns and is positioned under each diaphragm to prevent or limit deflection beyond the elastic limit of the diaphragm 14. To comply with allowable deflections for elastic analysis, the diaphragm may have a vertical deflection of up to one fourth of its thickness. For example, if the thickness is 140 microns, then the maximum deflection for elastic strain is 35 microns, the deflection being restricted by a support plate or membrane as shown. A tolerance on this 35 micron deep recess would be approximately plus or minus 10 microns. At the maximum allowable deflection, the stress within the diaphragm will not reach the rupture point and thus will return to a stable position after the load has been removed. The etched depth 19 in FIG. 7 is depicted as an exemplary depth of 25 microns +5, −3.

Preferably there is fixedly attached to the upper surface of the sensor array a polymer cover layer 20 (FIG. 8) which protects the entire upper sensor surface area. Most any polyamide material and any suitable manner of applying it will suffice, while preferably preserving an annular space 15 above the said diaphragm portion 14. One such method contemplates placing a liquid polymer in a shallow dipping tray to a specified level which will assure the desired finished thickness after suspending the sensor body in an inverted position into the liquid polymer. The polymer is then allowed to cure around the bossed tactile elements and adjacent uppermost surfaces, while preserving the aforesaid areas 15. The tray would then be stripped away from the silicon subassembly to ready it for further processing. Alternatively, if the space were not preserved a more resilient or elastic type material would be needed so as to lessen the likelihood of impeding the sensitivity of the collective transducer elements. Some exemplary combined cross sections and relative dimensions for one transducer element or structure including cover layer 20 are shown collectively in FIGS. 2, 3, 4, 7, 8, 9 and 10a–10d.

The circuitry portions more directly embodied in conjunction with the wafer body 12 and/or its support layer 18 are designated C1 (FIG. 1), whereas related circuitry portions to be further identified which may be prepared on separate mounting boards, chips or strips are designated C2 (FIG. 1), and are electrically interconnected by any suitable wiring buss conduit, harness or connector means.

As stated above, those electrical circuitry components which are directly associated with or more integrally fabricated as part of the body 12, preferably are applied to body 12 prior to the chemical etching steps. Some of the etching steps are diagrammatically represented in FIGS. 10a–10d. Continuing with the circuitry fabrication, with reference to FIGS. 4 and 11, each diaphragm area 14 at the underside of each bossed tactile element 16 is provided with four pair of separately constituted orthogonally disposed piezoresistive regions or areas PZR1–PZR8 inclusive, with one pair disposed on each side of the boss area on each of the X and Y axes. By use of a known boron impurity diffusion process, the PZRs are intimately diffused into the silicon crystal lattice surfaces to achieve a desired substantially identical resistance value. A range for these values may be between 1000 and 10,000 ohms, with a more preferred exemplary value for this embodiment being approximately 6000 ohms. The selected value is such as to avoid undue power consumption and any attendant undue stress gradients which could damage the sensor. These PZRs are then electrically interconnected by the two low resistance, highly conductive, orthogonally disposed very fine metallic conductor strips S1 and S2. S1 and S2, which may be of thin film aluminum, are electrically insulated from each other at their crossing point. Their low resistance is to be much less than one ohm per interconnection, the lower the better.

Strips S1 and S2 are preferably applied by a known vapor deposition process and preferably in a multiple array pattern, as with the PZRs, to thereby simultaneously fabricate at least a substantial part of the circuitry for a predetermined plurality of the arrays of sensing elements. Other suitable thin film bonding techniques may be used to apply the piezoresistive areas and their interconnections. Exemplary dimensions of the strips S1 and S2, and their related connecting leads or conductor strips, may be approximately only 50 microns wide and less than approximately 10 microns thick. The PZRs are located in areas of high diaphragm stress and are electrically tapped to measure voltage changes caused by diaphragm deformation resulting from external loading, both normal and/or shear, upon the boss 16 centered on each of the diaphragms 14.

Figure 11:
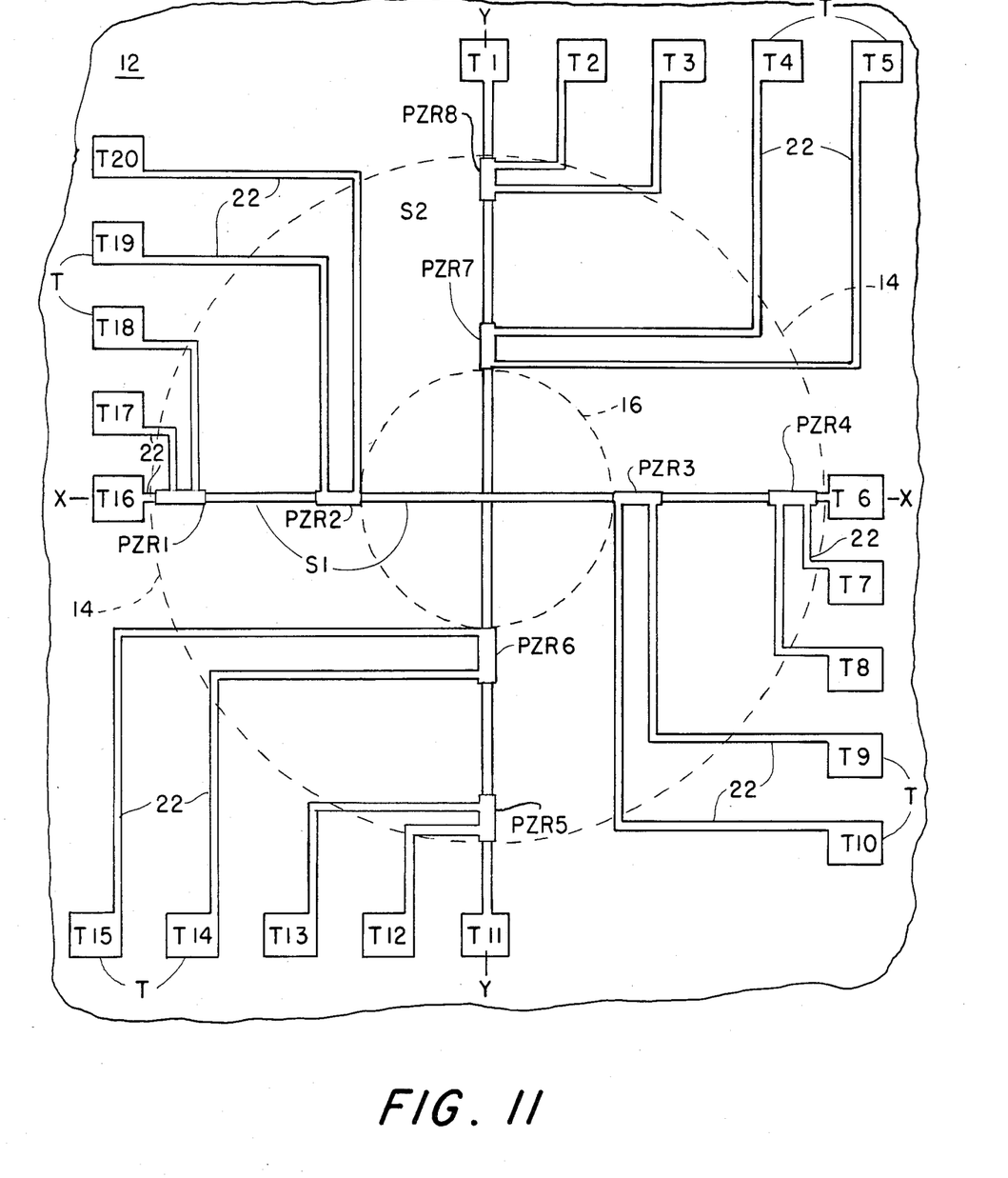
FIG. 11 is an enlarged diagrammatic fragmentary bottom plan view of a sensor element diaphragm's lower surface on which a piezoresistive layout is shown.

These tapped areas may be better seen in FIG. 11, wherein each of the PZRs 1–8 are provided at their opposite ends with similar low resistance, highly conductive thin film conductor strips 22 leading to the suitably arranged tap-off points T, thus facilitating fabrication of the balance of the circuitry.

Figures 8, 9:
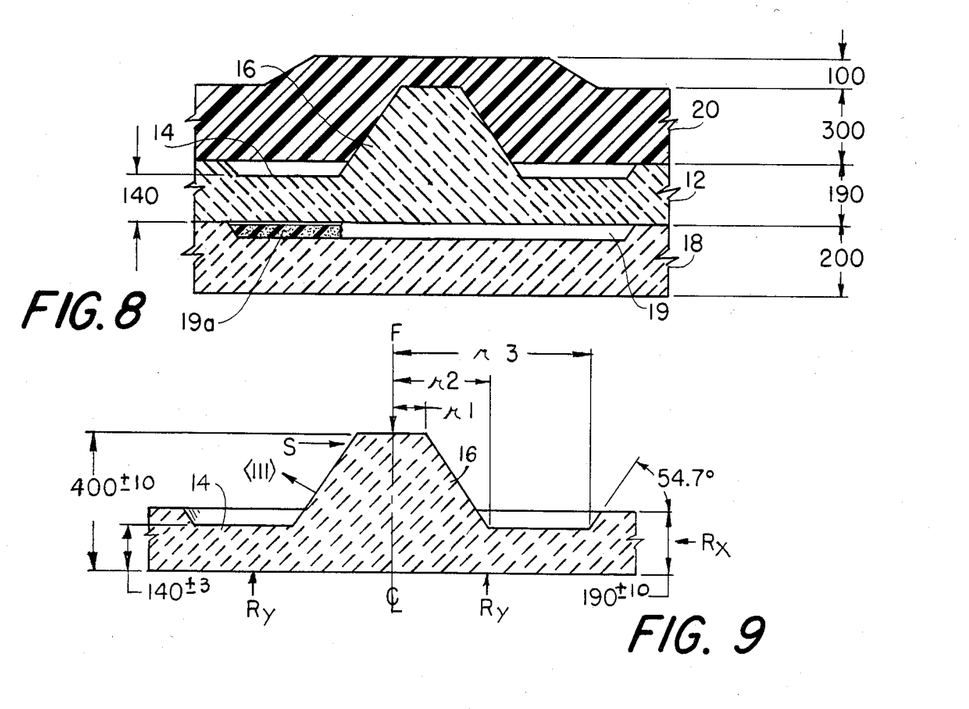
FIG. 8 is also an enlarged exemplary fragmentary cross-sectional detail view of the three layers which comprise one transducer cell of our array-type tactile sensor.
FIG. 9 is a cross-sectional free body diagram illustrating combined loading on a tactile sensing element.
Figure 12:
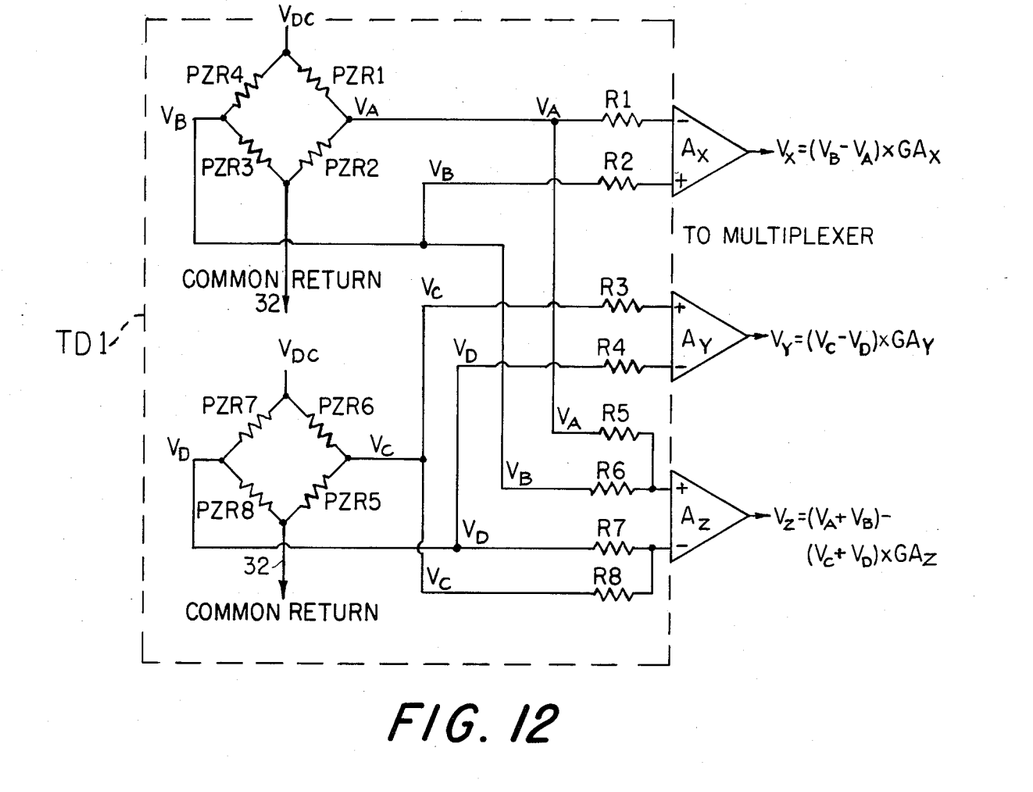
FIG. 12 is an exemplary electrical schematic showing a Wheatstone Bridge arrangement of the piezoresistive elements for detecting and measuring strain applied to the sensors hereof.
Figure 13:
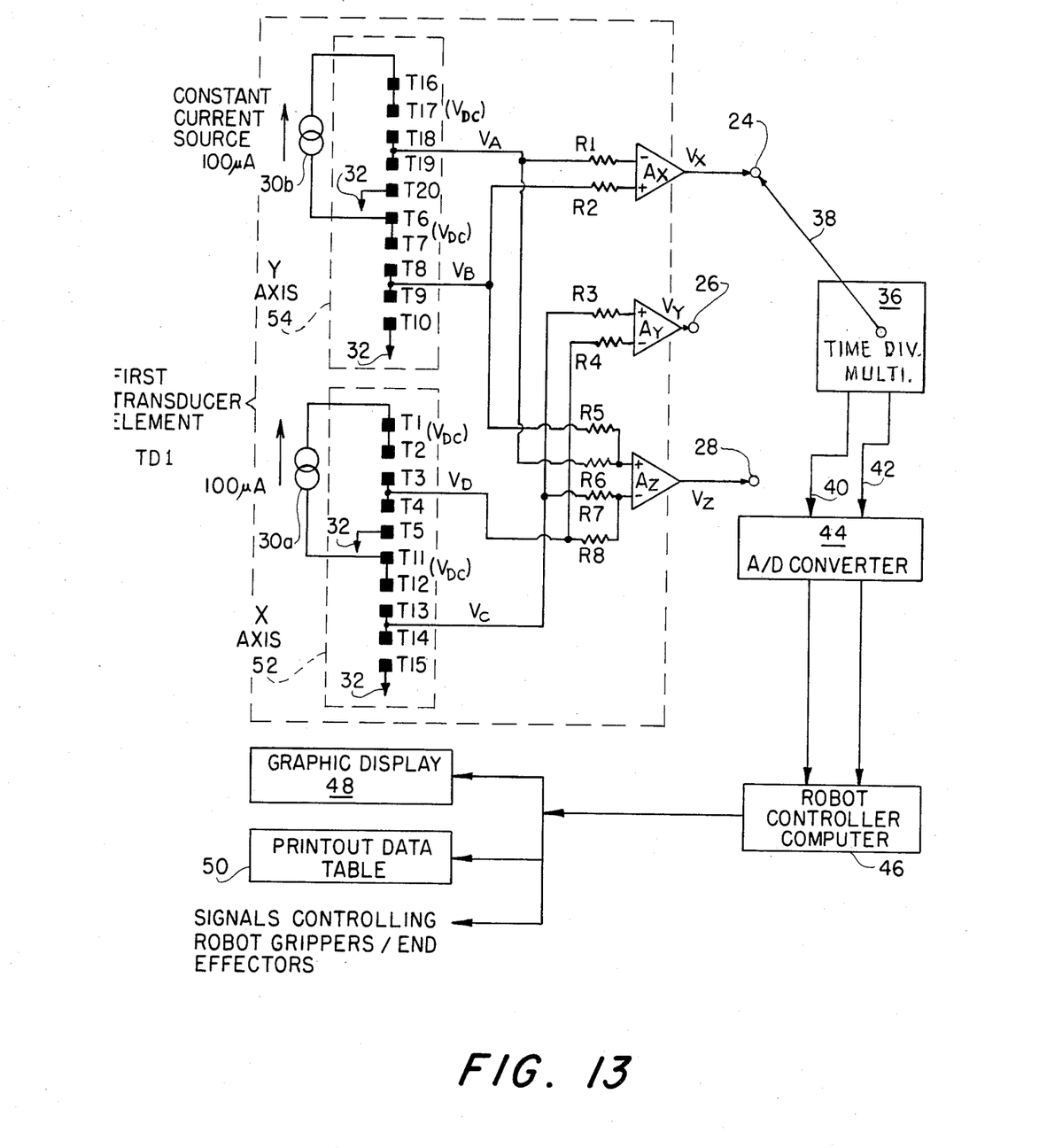
FIG. 13 is a combination electrical schematic of one of sixteen transducer elements in conjunction with a block diagram showing an exemplary full schematic system embodying our novel tactile sensor.

Reverting to FIG. 9, the illustrative free body diagram incorporated therein depicts potential forces F and S and their respective reactions Rx and Ry. The diaphragm 14 will deflect in response to a load F applied normal or perpendicular to the top of tactile boss 16. The strain which occurs along the diaphragm's lower surface then can be measured by a circuitry arrangement such as shown in FIGS. 11–13 including the aforementioned eight piezoresistive regions. This strain then can be readily related to the actual applied load, as will be further described. A second mode of deflection occurs when a shear or lateral load (S) is applied to the boss 16. Again the strain at the lower diaphragm surface due to this loading can be similarly measured by the same illustrated circuitry of FIGS. 11–13. This strain also can be related to the applied load. These PZRs or piezoresistors change their resistive properties when strained and perform in a manner similar to typical metal foil strain gauges. The PZRs 1–8 are shown in the electrical schematic of FIG. 12, forming two Wheatstone bridges in conjunction with each tactile or boss element 16. The two Wheatstone bridges of FIG. 12 detect the strain, and, as a result of this particular arrangement, this electromechanical structure will enable measurement of both normal load magnitude and lateral load component magnitudes. From these components, a vector may be computed to reveal or yield the direction of the lateral load. All sixteen transducer elements TD1–TD16 of this array-type sensor work in concert to provide information of load distribution across the sensor contact area. A constant-current source device 30 is used to assure a constant current throughout the circuitry.

The voltage that appears across each PZR results when a constant current is forced through each conducting strip, S1 and S2, from a known, constant-current source. As the diaphragm is deformed, areas of tension and compression are created. Since the PZRs are located over high tension/compression areas their resistance value will change. In the case of tension, the resistance value increases. For compression, the resistance value of the compressed PZR decreases. Since a constant, known current is flowing through each conducting strip, the change in resistance of each PZR is indicated by the measurement of a change in voltage, directly proportional to the change in resistance, across each PZR.

As previously mentioned, the measurement of these voltage changes is done via electrical tap-off points T which are shown in FIGS. 11 and 13. The tap-off points enable the voltage developed across each PZR to be measured directly or to be electrically connected to external electronic circuitry, generally denoted C2 (FIG. 1). By connecting the tap-off points to electronic circuitry, data reduction techniques can be used to simplify the data coming from each of the transducer cells TD. There are two tap-off points per PZR; one at each side of the PZR. These tap-off points also are metallic, low-resistance conductors that may be deposited onto the back of each diaphragm 14.

Two Wheatstone bridge-like PZR configurations per transducer cell TD are used to reduce tactile sensor array data to a form that represents the X and Y lateral (or shear) load and the Z, or normal, load directions of applied force on each transducer cell center boss. The following operational description is for one transducer cell but is, also, true for the other transducer cells in the tactile sensor array. One conducting strip S1, with the four PZRs, forms one Wheatstone bridge corresponding to the X direction of applied force. The other perpendicular conducting strip S2, with four PZRs, forms the other Wheatstone bridge corresponding to the Y direction of applied force. Refer to FIGS. 11–13 for the correlation between the PZRs on each conducting strip of a transducer cell to the resistance shown in the Wheatstone bridges for the X and Y axes for that transducer cell. The outputs from the two Wheatstone bridges, the voltages at points, $V_A$, $V_B$, $V_C$, $V_D$, are connected to three (instrumentation type) operational amplifiers (hereafter, abbreviated to op-amp) designated $A_X$, $A_Y$, and $A_Z$. Op-amp $A_X$ is configured to output the difference between two input signals; one applied to the non-inverting or plus terminal and the other applied to the inverting or negative terminal. Op-am $A_Z$ is configured to, first, sum the input signals applied to the non-inverting terminal and to the inverting terminal, then second, to output the difference between the summed signals coming from both input terminals. Op-amp $A_Y$ is configured to output the difference between two input signals (the same configuration as that for op-amp $A_X$). Resistors R1 through R8 are identical in value and are in the circuit to act as instrumentation-type, op-amp gain control elements. Their values typically are between 1000 ohms and 5000 ohms.

Operationally, the voltage output from op-amp $A_X$, which is labeled $V_X$, is the difference in the voltages at points $V_A$ and $V_B$, i.e., $V_X = V_B - V_A$ times the amplification factor, or gain G, of the op-amp $A_X$ which is designated as $GA_X$ (FIG. 12). This difference is the output $V_X$, which corresponds to X axis motion. Additionally, voltages at points $V_A$ and $V_B$ are added together at the non-inverting terminal of op-amp $A_Z$. Voltages at points $V_C$ and $V_D$ are subtracted at op-amp $A_Y$, i.e., $V_Y = V_C - V_D$, and this result is multiplied by the amplification factor, or gain, of op-amp $A_Y$, which is designated as $GA_Y$ (FIG. 12). This difference is the output $V_Y$, which corresponds to Y axis motion. The voltages at points $V_C$ and $V_D$ are, also, added together at op-amp $A_Z$, but at its inverting or negative terminal. The output from op-amp $A_Z$, which corresponds to the output voltage $V_Z$, or Z axis motion, is the difference between the sum of the voltages at points $V_A$ and $V_B$ and the sum of the voltages at points $V_C$ and $V_D$, i.e., $V_Z = (V_A + V_B) - (V_C + V_D)$, which is multiplied by the amplification factor, or gain, of op-amp $A_Z$, which is designated as $GA_Z$ (FIG. 12). The PZRs comprising the two Wheatstone bridges are connected in the reverse configuration. That is, the X direction Wheatstone bridge has the two outer PZRs (along the X axis) PZR1 and PZR4 as the two upper legs of the bridge and the two inner PZRs (along the X axis) PZR2 and PZR3 as the two lower legs of the bridge, which are connected to the common return line 32 (FIGS. 12 and 13). For the Y direction Wheatstone bridge, the two inner PZRs (along the Y axis) PZR6 and PZR7 are the two upper legs of the bridge and the two outer PZRs (along the Y axis) PZR5 and PZR8 are the two lower legs of the bridge, also connected to the instrumentation op-amp common return 32. In total, this circuit arrangement outputs signals corresponding to the X, Y, and Z load components on the center boss of an individual transducer cell.

External loading of the transducer cell and the translation of loading to op-amp output will now be described. When the transducer cell undergoes lateral, or shear, loading in, for example the X direction the PZRs along the conducting strip S1 corresponding to the X axis, alternately will be in tension and compression. PZRs 1 and 3 are under tension and PZRs 2 and 4 are under compression. Referring to drawing FIGS. 11 and 12 and the Wheatstone bridge corresponding to the X direction, tension in PZRs 1 and 3 causes increased resistance in the bridge elements corresponding to PZRs 1 and 3, while, compression of PZRs 2 and 4 causes lowered resistance in the bridge elements corresponding to PZRs 2 and 4. This results in a change of voltage at point $V_A$ that is proportionally less that the increased voltage at point $V_B$. The voltages at point $V_A$ and $V_B$ are applied to the inverting and non-inverting terminals of op-amp $A_X$, respectively. The output of op-amp $A_X$ will be zero if there is no loading on the transducer cell, positive in value if the loading is in the positive direction along the X axis, or of negative value if the loading is in the negative direction along the X axis. There will be no output from either op-amp $A_Y$ or $A_Z$. Op-amp $A_Y$ will show an output of zero since there is no strain on the PZRs along the Y axis due to X axis loading; therefore the voltage at point $V_C$ equals the voltage at point $V_D$ and the output voltage of op-amp $A_Y$, which is $V_Y$, equals the voltage at point $V_C$ minus the voltage at point $V_D$, which results in $V_Y$ equalling zero. Op-amp $A_Z$ will have an output of zero since the sum of the voltages at points $V_A$ and $V_B$ at its non-inverting terminal will be equal to the sum of the voltages at points $V_C$ and $V_D$ at its inverting terminal, and the output of op-amp $A_Z$, which is the voltage $V_Z$, equals the sum of the voltages at points $V_A$ and $V_B$ minus the sum of the voltages at points $V_C$ and $V_D$ which would, in this case, be zero.

For loading that is entirely along the Y axis, the above description for X axis loading can be similarly applied. In this case, PZRs 5 and 7 are under tension and PZRs 6 and 8 are under compression. Referring to FIGS. 11 and 12, the Wheatstone bridge corresponding to the Y direction, tension in PZRs 5 and 7 causes increased resistance in the bridge elements corresponding to those PZRs, while, compression of PZRs 6 and 8 causes lowered resistance in the bridge elements corresponding to PZRs 6 and 8. This results in a change of voltage at point $V_C$ that is proportionally greater than the decreased voltage at point $V_D$. The voltages at points $V_C$ and $V_D$ are applied to the non-inverting and inverting terminals of op-amp $A_Y$, respectively. The output of op-amp $A_Y$ will be zero if there is no loading on the transducer cell, positive in value if the loading is in the positive direction along the Y axis, or negative value if the loading is in the negative direction along the Y axis. There will be no output from either op-amp $A_X$ or $A_Z$. Op-amp $A_X$ will show an output of zero since there is no strain on the PZRs along the X axis due to Y axis loading; therefore the voltage at point $V_A$ equals the voltage at point $V_B$ and the output voltage of op-amp $A_X$, which is $V_X$, equals the voltage at point $V_B$ minus the voltage at point $V_A$, which results in $V_X$ equalling zero. Op-amp $A_Z$ will have an output of zero since the sum of the voltages at points $V_C$ and $V_D$ at its inverting terminal will be equal to the sum of the voltages at points $V_A$ and $V_B$ at its non-inverting terminal, and the output of op-amp $A_Z$, which is the voltage $V_Z$, equals the sum of the voltages at points $V_A$ and $V_B$ minus the sum of the voltages at points $V_C$ and $V_B$, which would, in this case, be zero.

If there is loading on a transducer cell that has both X and Y load components, but no normal load component, then op-amps $A_X$ and $A_Y$ will both have outputs of various magnitudes and the voltage output of op-amp $A_Z$ will equal zero. The magnitude of op-amp output voltages $V_X$ and $V_Y$, which represent the X and Y component magnitudes of the applied load, will depend upon the direction of the applied load. For example, if the applied load was at 45 degrees with respect to the X and Y axes, the output voltage $V_X$ would equal that of $V_Y$. If the applied load was less than 45 degress with respect to the X and Y axes, the magnitude of the output voltage $V_X$ would be greater than that of $V_Y$. The converse would be true if the applied load was greater than 45 degrees with respect to the X and Y axes; i.e., the magnitude of the output voltage $V_X$ would be less than that of $V_Y$. Loading that is between 0 and 90 degrees with respect to the X and Y axes will produce output voltages $V_X$ and $V_Y$ that will both be of a positive value. Loading that is between 90 and 180 degrees with respect to the X and Y axes will produce a negative output voltage $V_X$ and a positive output voltage $V_Y$. Loading that is between 180 and 270 degrees with respect to the X and Y axes will produce output voltages $V_X$ and $V_Y$ that are both negative in value. Loading that is between 270 and 360 degrees with respect to the X and Y axes will produce an output voltage at $V_X$ that is positive in value and an output voltage at $V_Y$ that is negative in value. If there is a normal load component, or Z axis component, present with X and Y axes lateral load components, then op-amp $A_Z$ will have a voltage output $V_Z$ of some magnitude related to the applied load, in addition to voltage outputs $V_X$ and $V_Y$ from op-amps $A_X$ and $A_Y$, respectively.

When there is only normal loading of the transducer cell, the PZRs along the X and Y axes will behave in the same manner. That is, the outer PZRs on each axis will be in compression (lowering PZR resistance) and the inner PZRs on each axis will be under tension (increasing PZR resistance). In this case, the voltage at point $V_A$ equals the voltage at point $V_R$ and the voltage at point $V_C$ equals the voltage at point $V_D$. The result is a voltage output greater than zero, only from op-amps $A_Z$. Op-amps $A_X$ and $A_Y$ will both have output voltages, $V_Z$ and $V_Y$, that are equal to zero since each op-amp is in a different configuration and each op-amp has identical voltages applied to its inverting and no-inverting terminals. Due to the Y axis Wheatstone bridge being in the reverse configuration as that of the X axis Wheatstone bridge, the voltage at points $V_A$ and $V_B$ will be proportionally higher than the voltages at points $V_C$ and $V_D$, which will be, by the same proportion, less than would be the voltage values of points $V_A$, $V_B$, $V_C$, and $V_D$ if the transducer cell went unloaded. If both Wheatstone bridges were in the same configuration—meaning that the PZRs for both bridges were in the same order or arrangement, the voltages at points $V_A$ and $V_B$ and the voltages at points $V_C$ and $V_D$ would both be proportionally greater than their unloaded values. The result would be a zero output voltage from op-amp $A_Z$.

Figure 15:
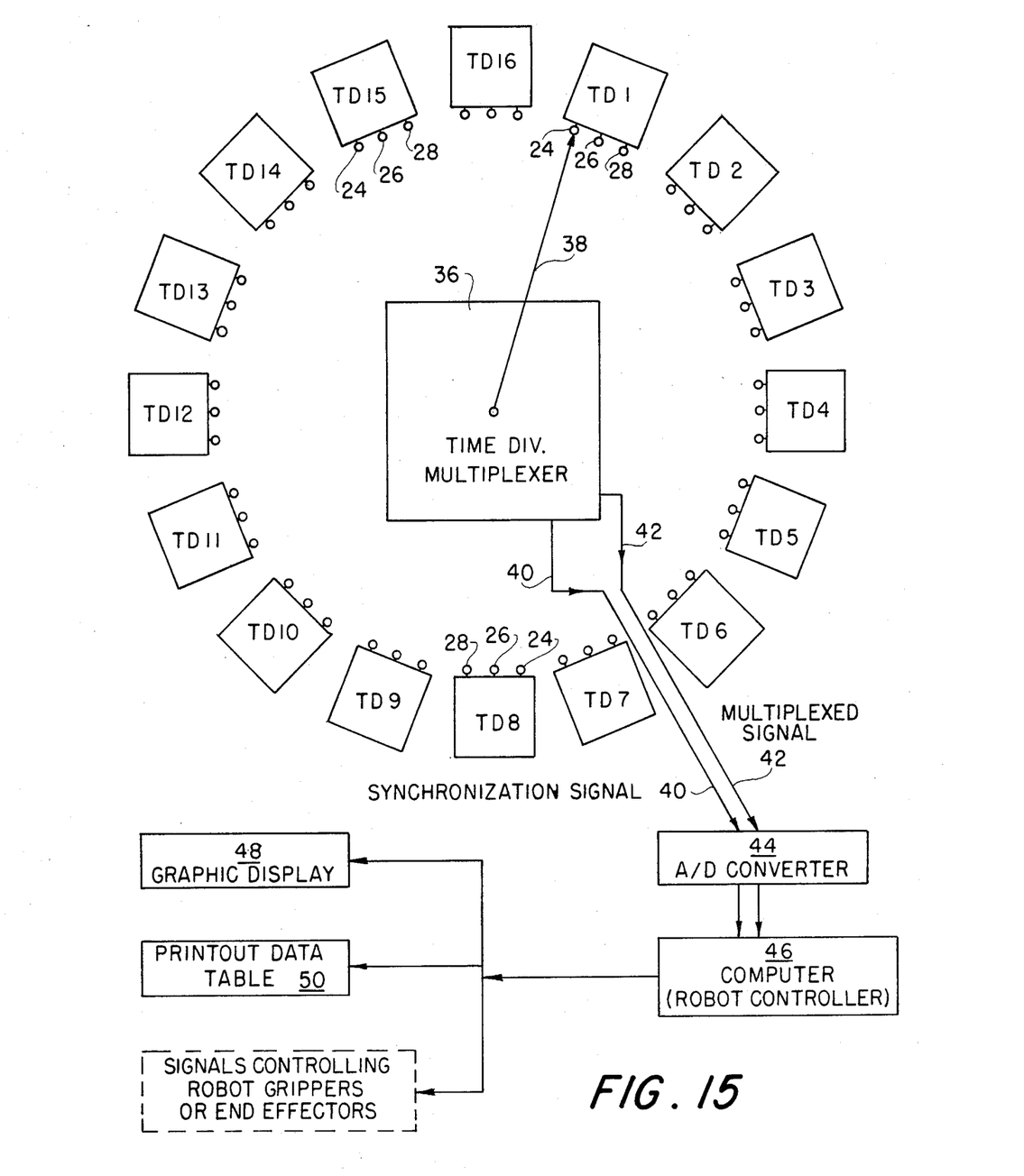
FIG. 15 is still another block diagram schematic showing all sixteen transducers arranged for time-division multiplexing in a schematic system similar to that of FIG. 13.

To further reduce this data to a form that can be easily read by a computer, the X, Y, and Z applied force data from each of the transducer cells TD1–TD16 is time-division multiplexed (hereafter, abbreviated to TDM). The transmission of samples of information from several signal channels simultaneously through one communication system, with different channel samples staggered in time, is called time-division multiplexing. The schematics of drawing FIGS. 13 and 15 include a box representation of such a multiplexer designated 36. In a typical time-division multiplexing scheme, the various signals to be transmitted are sequentially sampled and combined for transmission over one channel. In conjunction with the illustrative time-division multiplexer 36, for simplicity there is schematically shown a mechanical switching arm 38 adapted to progressively contact the three op-amps output terminals 24, 26, 28 of each transducer TD1–TD16 (FIGS. 13, 15). However, in actual practice the multiplexer 36 would embody electronic switching means preferably with the op-amp output leads being hard-wired through to the multiplexing device which would make the progressive sampling. The time-division multiplexing preferably would be performed at a sampling rate of approximately 9600 hertz (100 hz bandwidth per load component times 48 channels times Nyquist sampling criteria, which is two times the total system bandwith). The result is a serial data stream consisting of the X, Y, and Z applied force data from all of the transducer cells. In other words, for a tactile sensor array comprising 16 transducer cells, there is a serial data stream composed of 48 pieces of information—the three X, Y, and Z applied load direction values per transducer cell multiplied by the 16 transducer cells. An additional feature of the TDM circuitry is that it provides a synchronization signal 40 enabling decoding of the multiplexed signal 42 by a computer 46. Synchronization signals for serial communication between the tactile sensor/external electronics and a computer are also provided by the external electronics. Before being read by a computer the multiplexed signal and the synchronization signal must pass through an analog-to-digital converter 44 to be converted to a digital format which is readable by a computer. Upon decoding of the multiplexed signal, the computer can then interpret and pictorially represent the tactile sensor data, such as schematically shown in FIGS. 13 and 15 by graphic display means 48 and print-out data table means 50.

Portions of the circuit means include various external circuitry components apart from those which are more intimately directly embodied in the sensor main body 12 and its support layer 18. Such external circuity components are diagrammatically designated C2 in the end-effector of drawing Figure 1. Such external circuitry components may include the operational amplifiers $A_X$, $A_Y$, $A_Z$, the constant current source 30, 30a, 30b, and the TDM multiplexer 36, among others.

In the schematic representation of FIG. 13, the tap-off points T for the PZRs forming the wheatstone bridge-like circuitry for each of the X and Y axes are shown in vertical alignment and box-outlined in broken lines. These can be considered as piezoresistor conducting strips designated 52 and 54 respectively. In this exemplary embodiment, each transducer element TD1, enclosed in the larger dash-dot outline box, has a constant-current source 30a and 30b in conjunction with the collective tap-off points for each of the X and Y axes. The respective tap-off points for the respective sets of PZRs are wired to the op-amps in a manner corresponding to that shown in and discussed relative to the schematic of FIG. 12.

Figure 14:
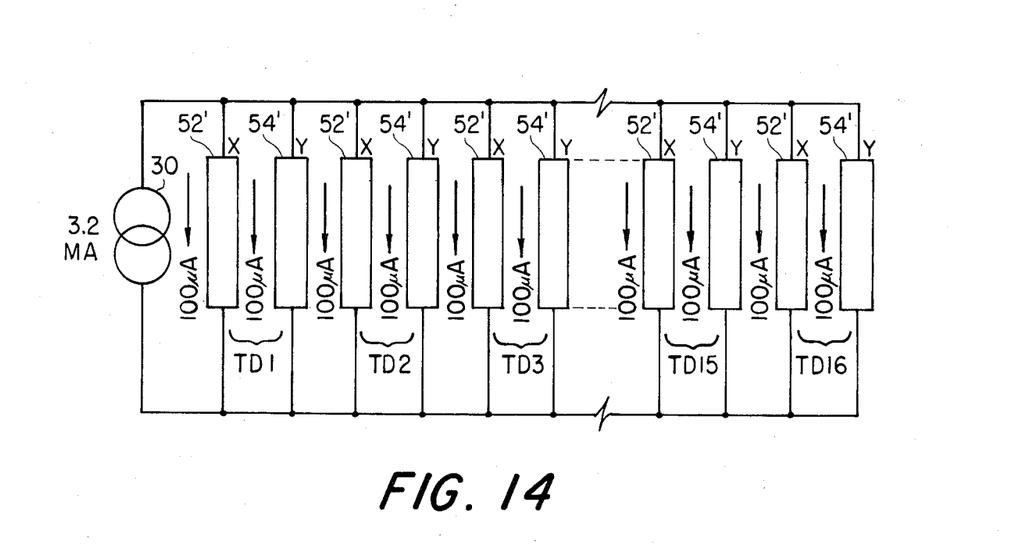
FIG. 14 is further schematic representative of sixteen tactile transducer elements in parallel connection with a constant-current source.

In the schematic of FIG. 14, the piezoresistor conducting strips for each transducers X and Y axis are designated 52' and 54' respectively. While only transducers TD1, TD2, TD3, and TD15 and TD16 are shown, it is understood that there are a total of 16, with the remaining inbetween ones being represented by the interrupted broken schematic lines in the figure.

In the representation of FIG. 14, the constant-current source 30 would have to have a capacity for generating 3.2 milliamps in order to provide the designated 100 microamp constant current to each of the sixteen pairs 52', 54' of the piezoresistor conducting strips.

From the foregoing detailed exemplary best mode description, it is apparent that a greatly improved triaxial tactile sensor has been evolved which satisfies the objectives set forth early in this application. In the discussions relative to the use of microthin and microminiature size terminology, we mean a thinness and size which normally is unobtainable by commonly known metallic or abrasive machining techniques. The term micro as used herein is understood to relate to sizes not exceeding approximately 400 microns. In this unique microminiature sensor, each of the array-comprising transducer elements would be generally similar in size to a grain of sand, which unique microsmall sizes are achievable by the use of the uniquely etched silicon wafer materials prepared with the stated crystal orientations.

It is contemplated that other crystal orientations may be possible because piezoresistive coefficients have directional characteristics and due to their anistropic elastic properties. Certain combinations are preferred for the signal strength or magnitude. Also the variations may be effected by known etch rates and the strength or solution of the etchant chemicals used. No claim is made herein to the unique process for fabricating the micro-sized sensor bodies.

While some specific exemplary embodiments have been illustrated and described with particular detail, it is understood that other variations and modifications may be contemplated and made without departing from the spirit of the invention and the scope of the broader attached claims. In this regard, relative to the support member 18 in FIG. 8, there may be occasions when the recess 19 might be chosen to be at least partially, if not fully, filled with a very soft resilient sponge-like material 19a. A further alternative contemplates a support material which at least in the areas beneath the respective transducer elements 14, 16 is sufficiently resilient to permit sensor boss and diaphragm deformation and still provide the necessary support protection to prevent rupturing of the diaphragms.

Other variations may embody some different fabrication of the electronic circuitry components and the respective parts upon which they are fabricated, and variations of bus connections or wiring harness equivalents interconnecting the internal and external electrical/electronic components. It is understood that variable parameters including variations in thickness and diameter of the diaphragms 14 and height of the bosses 16 will effect the loading capabilities or sensitivity of our improved sensor. Our novel triaxial sensor is designed to provide greatly increased grasp strength and load capabilities than any of the prior art type sensors of which we are aware as adapted for use in conjunction with robotic end-effectors.

While the disclosed tactile sensor has been described as being particularly useful with end-effectors of robotically controlled manipulators, other potential uses are contemplated. Many uses may involve a variety of manufacturing processes; it would be useful in further developing various prosthesis equipment; and is contemplated as being useful in conjunction with braille systems. For example, sensors of our improved type could be mounted on scanning arms, which sensors upon engagement with braille prepared literature and the like could effect translating via the generated electrical signals into some printed or audiospoken format as desired.

Therefore in conclusion, while some preferred embodiments and uses of the present invention have been described and/or suggested in various detail, other modifications and changes may be made by those skilled in the art without departing from the spirit and scope of this invention as defined in the appended claims.

We claim:

1. A very sensitive, high resolution, transducer array-type tactile sensor adaptable for use with various electro-mechanical and fluidic or pneumatic mechanisms and manipulators including robot end-effectors, for determining lateral or shear forces in conjunction with normal force measurement to aid in the determining of sensor-applied mechanical to electrical transduction forces which in turn help determine any object slip and/or object rotation in the grasp of a robot end-effector; said sensor comprising in combination:

(a) a micro-thinned silicon wafer main body member 12 having top and bottom surfaces and a predetermined plurality of closely spaced microminature, tactile sensor boss elements 16 forming an array, each boss element 16 disposed centrally of and projecting upwardly above the top surface from a reduced body thickness portion constituting an annular more flexible diaphragm portion 14, said bossed tactile sensor elements 16 and their respective diaphragm portions 14 being susceptible to mechanical perturbative movement from various applied forces including triaxial forces as applied to the various tactile boss elements surfaces;

(b) lower support layer means 18 upon which said main body member 12 via its bottom surface is engagingly supported, said layer means 18 being constituted by a layer of material which is thermally compatible to reduce any thermal stress gradient between said body member and support layer, said support layer having a corresponding plurality of recessed areas 19 corresponding generally in size and alignment location to that of the said diaphragms and tactile sensor boss elements 16; and (c) circuit means C1, C2 in association with said tactile sensor elements 16 to help constitute the transducer array including circuit portions C1 fabricated directly in conjunction with said main body 12 and support layer means 18, to generate electrical signals responsive to mechanical perturbation across said tactile sensor elements 16, with said electrical signals being adaptable for interpretive processing to effectively determine any object slip and/or object rotation of an object in the grasp of a robot end-effector.

2. The sensor of claim 1, wherein said circuit means C1 comprises multiple subcircuit portions applied to the bottom surface of said main body member 12, including subcircuit portions applied beneath each of the array's transducer diaphragm portions 14, said latter subcircuit portions including a plurality of piezoresistive-type resistors PZRs diffused in a predetermined X and Y axis orientation upon and relative to the silicon main body's particular crystal orientation, to thereby help configure Wheatstone bridge-type subcircuitry portions which help measure various transducer sensor element diaphragm strain resulting from loading applied to said tactile sensor.

3. The sensor of claim 2, wherein all of said sensor bosses 16 are of microminiature size having tapered frusto-conical form with substantially circular top and base portions; and wherein said piezoresistive-type subcircuit portions beneath each of said bossed diaphragmed portions include four pairs of said piezoresistors PZRs which are of substantially identical ohm value and diffused each in spaced apart relation into the silicon wafer body material 12, said four pair of PZRs including a first two spaced apart pairs PZRs 1, 2, and PZRs 3, 4 in alignment with each other, with each spaced pair at diametrically opposite sides of and beneath said tactile boss element's circular base portion, the alignment of said first two pair constituting an X-X axis; and a second two similarly aligned and spaced apart pairs PZRs 5, 6 and PZRs 7, 8 collectively disposed in alignment at substantially 90 degree offset from said first two pairs, also at the diametrically opposite sides of and beneath said tactile boss element's circular base portion, their alignment constituting a Y—Y axis intersecting with said X—X axis;

said tactile sensing boss elements 16 each having a vertical Z—Z axis disposed normal to and intersecting the crossed X—X and Y—Y axes; and wherein each of said subcircuit portions further include low resistance conductive strip portions S1 and S2 respectively interconnecting each of said two pairs of PZRs along their respective X and Y axis, with said strip portions S1 and S2 being electrically insulated from each other at their intersection; and each of said piezoresistive areas PZRs being further provided with at least two separate similarly low resistance conductive strips leading to aptly spaced apart tap-off points T, and a tap-off point from each outer endmost piezoresistive element on said X and Y axis, said tap-off points facilitating electrical circuit connections with other portions C2 of said overall circuit means.

4. The sensor of claim 1, further including a flexible polymer-type protective cover layer 20 superposed upon said bossed main body member 12.

5. The sensor of claim 4, wherein said protective cover layer 20 is applied in a manner so as to preserve a space 15 above each of said diaphragm portions 14.

6. The sensor of claim 1, wherein the plurality of tactile sensor elements 16 are disposed in regular, equally spaced, uniform length rows and columns arrangement, the equal spacing between rows and columns being approximately 1500 microns.

7. The sensor of claim 1, wherein the plurality of tactile sensor elements 16 are disposed in an irregular or offset rows and column arrangement.

8. The sensor of claim 1, wherein the plurality of tactile sensor elements 16 are disposed in at least partial concentric circular form.

9. The sensor of claim 1, wherein said silicon wafer main body member initially is of a thickness of between about 300–400 microns, but micro-machined or etched down in a manner leaving the tactile elements at substantially the full initial height thickness, while reducing the main body member 12 to approximately 190 microns, and said annular diaphragm portions each to a thickness of approximately 140 microns.

10. The sensor of claim 9, wherein said bossed tactile sensor elements 16 each have a circular cross-sectional form tapering downwardly generally uniformly from an uppermost top circular diameter of between about 126–136 microns to a base diameter of between about 490–510 microns, the taper being at an angle of about 54–55 degrees, and the tapered surface having a (111) crystal surface.

11. The sensor of claim 9, wherein said annular diaphragm 14 has an outer diameter of between about 980–1020 microns at its base.

12. The sensor of claim 9, wherein said support layer 18 is formed of a generally same silcon crystal material as said main body member 12; is of a thickness of about from 150–250 microns; and said recessed areas 19 are of from approximately 20–30 microns deep.

13. The sensor of claim 12, wherein said recessed areas 19 are at least partially filled with a resilient sponge-like material.

14. The sensor of claim 12, wherein said main body member has superposed thereon a flexible polymer-type protective cover layer 20 which has a main body thickness of from about 250–350 microns in the areas between said bossed tactile elements 16, and a thickness of from about 50–100 microns above said bossed tactile elements 16.

* * * * *